(12) United States Patent
Chen et al.

(10) Patent No.: US 12,321,520 B2
(45) Date of Patent: Jun. 3, 2025

(54) HAPTIC FEEDBACK METHOD FOR ELECTRONIC SYSTEM AND HAPTIC FEEDBACK ELECTRONIC SYSTEM

(71) Applicant: Silicon Integrated Systems Corp., Hsinchu (TW)

(72) Inventors: Yi-chen Chen, Hsinchu (TW); Min-han Lee, Hsinchu (TW); Kun-tien Ting, Hsinchu (TW)

(73) Assignee: Silicon Integrated Systems Corp., Hsinchu (TW)

( * ) Notice: Subject to any disclaimer, the term of this patent is extended or adjusted under 35 U.S.C. 154(b) by 69 days.

(21) Appl. No.: 18/218,966

(22) Filed: Jul. 6, 2023

(65) Prior Publication Data

US 2024/0012481 A1 Jan. 11, 2024

(30) Foreign Application Priority Data

Jul. 11, 2022 (TW) ................................. 111125986

(51) Int. Cl.
*G08B 21/00* (2006.01)
*G06F 3/01* (2006.01)
*H04W 76/14* (2018.01)

(52) U.S. Cl.
CPC ............ *G06F 3/016* (2013.01); *H04W 76/14* (2018.02)

(58) Field of Classification Search
CPC ..... G06F 3/016; G06F 3/03545; H04W 76/14
USPC ....................................................... 340/407.2
See application file for complete search history.

(56) References Cited

U.S. PATENT DOCUMENTS

| | | | |
|---|---|---|---|
| 9,310,926 B2 | 4/2016 | Chung | |
| 9,829,979 B2 | 11/2017 | Brombach et al. | |
| 10,579,252 B2 | 3/2020 | Brombach et al. | |
| 10,922,934 B2 | 2/2021 | Deng et al. | |
| 11,625,145 B2 | 4/2023 | Van Wiemeersch et al. | |
| 2018/0299960 A1* | 10/2018 | Knott | G06N 3/084 |
| 2020/0211339 A1* | 7/2020 | Deng | H04B 5/77 |
| 2022/0011869 A1* | 1/2022 | Lawrence | G01P 15/00 |

FOREIGN PATENT DOCUMENTS

| | | |
|---|---|---|
| CN | 106723710 A | 5/2017 |
| CN | 106951098 A | 7/2017 |
| CN | 110032274 A | 7/2019 |
| TW | 201439882 A | 10/2014 |

* cited by examiner

*Primary Examiner* — Mark S Rushing
(74) *Attorney, Agent, or Firm* — The Roy Gross Law Firm, LLC; Roy D. Gross

(57) ABSTRACT

A haptic feedback method for an electronic system includes pairing an electronic device with a first wireless communication module and an input device with a second wireless communication module and a haptic feedback motor unit, inputting a control signal to the electronic device through the input device, and sending a wireless motor driving signal to the second wireless communication module of the input device by the first wireless communication module of the electronic device according to the control signal, so that the second wireless communication module generates a wired motor driving signal according to the wireless motor driving signal and directly transmits the wired motor driving signal to the haptic feedback motor unit to directly enable vibration of the haptic feedback motor unit.

13 Claims, 5 Drawing Sheets

HAPTIC FEEDBACK METHOD FOR ELECTRONIC SYSTEM AND HAPTIC FEEDBACK ELECTRONIC SYSTEM

CROSS REFERENCE TO RELATED APPLICATIONS

This application claims priority to Taiwan Patent Application No. 111125986, filed Jul. 11, 2022, the disclosure of which is incorporated herein by reference in its entirety.

FIELD OF INVENTION

The present invention relates to a technical field of haptic feedback methods, and particularly to a haptic feedback method for an electronic system and a haptic feedback electronic system of which an input device can drive a vibration motor without a motor driver chip.

BACKGROUND OF INVENTION

Haptic feedback systems are widely used in various electronic devices, such as smart phones, tablets, notebook computers, and desktop computers, and can provide users with corresponding haptic feedback through vibration motors built-in input devices, according to commands input by users to electronic devices through input devices, such as mice and styli, or according to output information presented by user interfaces of the electronic devices, thus enhancing the human-computer interaction between the users and the electronic devices.

Conventional haptic feedback technologies use vibration motor control chips built in input devices and further operating with manufacturers' specific vibration algorithm to provide users with feedback functions, such as errors, clicks, and strokes, for user interfaces on electronic devices having display units. Advantages of such technologies lie in their flexibility and consistency across systems and different vibration motors. However, the additional use of control chips by the input devices increases power consumption of the input devices, incurs costs of the input devices, and makes circuit board layouts complex in the input devices, which results in difficulties in reducing sizes of the input devices. In addition, due to the universal principle of vibration chips, for fine-tuning of specific vibration motor products, the ideal accuracy cannot be achieved.

Referring to FIG. 1, a haptic feedback electronic system using the above-mentioned conventional haptic feedback technologies includes an electronic device 8 and an input device 9. The electronic device 8 is provided with a Bluetooth module 82 and an operating system 81. The input device 9 is an accessory device capable of inputting signals to the electronic device 8, such as a mouse and a stylus, and includes a main control unit 91, a Bluetooth module 92, a motor driver chip 93, and a vibration motor 94. The main control unit 91, the Bluetooth module 92, the motor driver chip 93, and the vibration motor 94 are electrically connected to one another. During operation, the input device 9 and the electronic device 8 are paired with each other through the two Bluetooth modules 82 and 92, and then the input device 9 inputs a control signal to the electronic device 8, and the two Bluetooth modules 82 and 92 communicate according to the control signal, so that the input device 9 can receive feedback signals from the operating system 81 through the two Bluetooth modules 82 and 92. Then, the Bluetooth modules 82 and 92 of the input device 9 instruct the motor driver chip 93 to drive the vibration motor 94 according to the received feedback signals.

However, as mentioned above, although the motor driver chip 93 between the Bluetooth modules 82 and 92 of the input device 9 and the vibration motor 94 can provide cross-device and cross-system applications, the use of the motor driver chip 93 complicates circuit layouts and increases sizes of the input device 9, which is not conducive to compact design of the input device 9, increases hardware costs, and fails in the ideal fine-tuning of specific motors.

SUMMARY OF INVENTION

Based on the disadvantages that input devices of current haptic feedback electronic systems are required to drive vibration motors through built-in motor driver chips, the present invention provides a haptic feedback method for an electronic system and a haptic feedback electronic system.

An object of the present invention is to provide a haptic feedback method for an electronic system, including a device pairing step, an operation step, and a motor driving step.

The device pairing step includes pairing an electronic device and an input device. A first wireless communication module is arranged in the electronic device, a second wireless communication module and a haptic feedback motor unit electrically connected to the second wireless communication module are arranged in the input device, and the electronic device and the input device are wirelessly connected to each other through the first wireless communication module and the second wireless communication module.

The operation step includes inputting a control signal to the electronic device through the input device.

The motor driving step includes sending a wireless motor driving signal to the second wireless communication module of the input device by the first wireless communication module of the electronic device according to the control signal, so that the second wireless communication module generates a wired motor driving signal according to the wireless motor driving signal and directly transmits the wired motor driving signal to the haptic feedback motor unit to directly enable vibration of the haptic feedback motor unit.

In a preferred embodiment of the present invention, the first wireless communication module is a first Bluetooth module, and the second wireless communication module is a second Bluetooth module.

In a preferred embodiment of the present invention, the first wireless communication module is a first Wi-Fi module, and the second wireless communication module is a second Wi-Fi module.

In a preferred embodiment of the present invention, the second wireless communication module includes a wireless signal control unit, a memory, and a signal output unit, wherein the wireless signal control unit is electrically connected to the memory and the signal output unit, and the signal output unit is coupled to the haptic feedback motor unit.

In a preferred embodiment of the present invention, a motor vibration mode data unit is configured in the signal output unit, and the motor driving step further includes sending the wireless motor driving signal to the second wireless communication module of the input device through the first wireless communication module of the electronic device according to the control signal, so that the second wireless communication module, according to the wireless motor driving signal and the motor vibration mode data unit in the signal output unit, generates the wired motor driving signal and directly transmits the wired motor driving signal to the haptic feedback motor unit to directly enable vibration of the haptic feedback motor unit according to a vibration mode in the motor vibration mode data unit.

In a preferred embodiment of the present invention, a motor vibration mode data unit is stored in the memory, and the motor driving step further includes sending the wireless motor driving signal to the second wireless communication module of the input device through the first wireless communication module of the electronic device according to the control signal, so that the second wireless communication module, according to the wireless motor driving signal and the motor vibration mode data unit in the memory called by the signal output unit, generates the wired motor driving signal and directly transmits the wired motor driving signal to the haptic feedback motor unit to directly enable vibration of the haptic feedback motor unit according to a vibration mode in the motor vibration mode data unit.

In a preferred embodiment of the present invention, the electronic device includes a built-in operating system, and prior to the motor driving step, the haptic feedback method for the electronic system further comprises a vibration determination step. The vibration determination step includes driving, only in response to determining a triggering vibration signal is contained in the control signal through the operating system, the first wireless communication module to send the wireless motor driving signal.

Another object of the present invention is to provide a haptic feedback electronic system including an electronic device including a main control module, a first wireless communication module, and an operating system, the first wireless communication module electrically connected to the main control module, and the operating system coupled to the main control module. An input device is configured to wirelessly connect to the electronic device and input a control signal to the electronic device and includes a main control unit, a second wireless communication module, and a haptic feedback motor unit. The second wireless communication module is electrically connected to the main control unit and is configured to wirelessly connect to the first wireless communication module, so that the electronic device is wirelessly connected to the input device, and the haptic feedback motor unit is electrically connected to the second wireless communication module and is configured to vibrate according to a wired motor driving signal directly transmitted to the haptic feedback motor unit through the second wireless communication module.

In a preferred embodiment of the present invention, the first wireless communication module of the electronic device is configured to send a wireless motor driving signal to the second wireless communication module of the input device according to the control signal, so that the second wireless communication module generates the wired motor driving signal according to the wireless motor driving signal and directly transmits the wired motor driving signal to the haptic feedback motor unit to directly enable vibration of the haptic feedback motor unit.

In a preferred embodiment of the present invention, the first wireless communication module is a first Bluetooth module, and the second wireless communication module is a second Bluetooth module.

In a preferred embodiment of the present invention, the first wireless communication module is a first Wi-Fi module, and the second wireless communication module is a second Wi-Fi module.

In a preferred embodiment of the present invention, the second wireless communication module includes a wireless signal control unit, a memory, and a signal output unit. Specifically, the wireless signal control unit is electrically connected to the memory and the signal output unit, and the signal output unit is coupled to the haptic feedback motor unit.

In a preferred embodiment of the present invention, a motor vibration mode data unit is configured in the signal output unit. Specifically, when the haptic feedback electronic system operates, the first wireless communication module of the electronic device sends a wireless motor driving signal to the second wireless communication module of the input device according to the control signal, so that the second wireless communication module, according to the wireless motor driving signal and the motor vibration mode data unit in the signal output unit, generates the wired motor driving signal and directly transmits the wired motor driving signal to the haptic feedback motor unit to directly enable vibration of the haptic feedback motor unit according to a vibration mode in the motor vibration mode data unit.

In a preferred embodiment of the present invention, a motor vibration mode data unit is stored in the memory. Specifically, when the haptic feedback electronic system operates, the first wireless communication module of the electronic device sends a wireless motor driving signal to the second wireless communication module of the input device according to the control signal, so that the second wireless communication module, according to the wireless motor driving signal and the motor vibration mode data unit in the memory called by the signal output unit, generates the wired motor driving signal and directly transmits the wired motor driving signal to the haptic feedback motor unit to directly enable vibration of the haptic feedback motor unit according to a vibration mode in the motor vibration mode data unit.

In a preferred embodiment of the present invention, the operating system is configured to drive, in response to determining a triggering vibration signal is contained in the control signal through the operating system, the first wireless communication module to send a wireless motor driving signal.

The present invention has at least the following advantages:

1. In the haptic feedback method for the electronic system and the haptic feedback electronic system of the present invention, the input device uses the second wireless communication module to directly serve as a driver of the haptic feedback motor unit, thus omitting the additional use of a motor driver chip, which in turn simplifies the hardware circuit layout in the input device, enabling the input device to be further miniaturized to achieve the compact design, and reducing manufacturing costs of the input device.

2. The signal output unit or the memory in the second wireless communication module of the input device of the present invention may pre-store or build the motor vibration model data unit, that is, a motor vibration mode data table or a hardware circuit. The motor vibration mode data table or the hardware circuit provides various vibration modes of a motor, such as high-frequency vibration, low-frequency vibration, continuous vibration, intermittent vibration, or compound vibration combining the above-mentioned multiple vibrations. Alternatively, the motor vibration mode data table or the hardware circuit contains a vibration algorithm defining at least one relational equation covering a moving speed of the input device and the vibration frequency of the haptic feedback motor unit, or stylus pen pressure information and the vibration frequency of the haptic feedback motor unit. By means of the above-mentioned technical solutions, the second wireless communication module can provide a variety of fine motor effects, and before the input device leaves factories, one or more motor effects in the signal output unit or the memory can be enabled through manufacturer's setting software.

DESCRIPTION OF PREFERRED EMBODIMENTS

Figure 1:
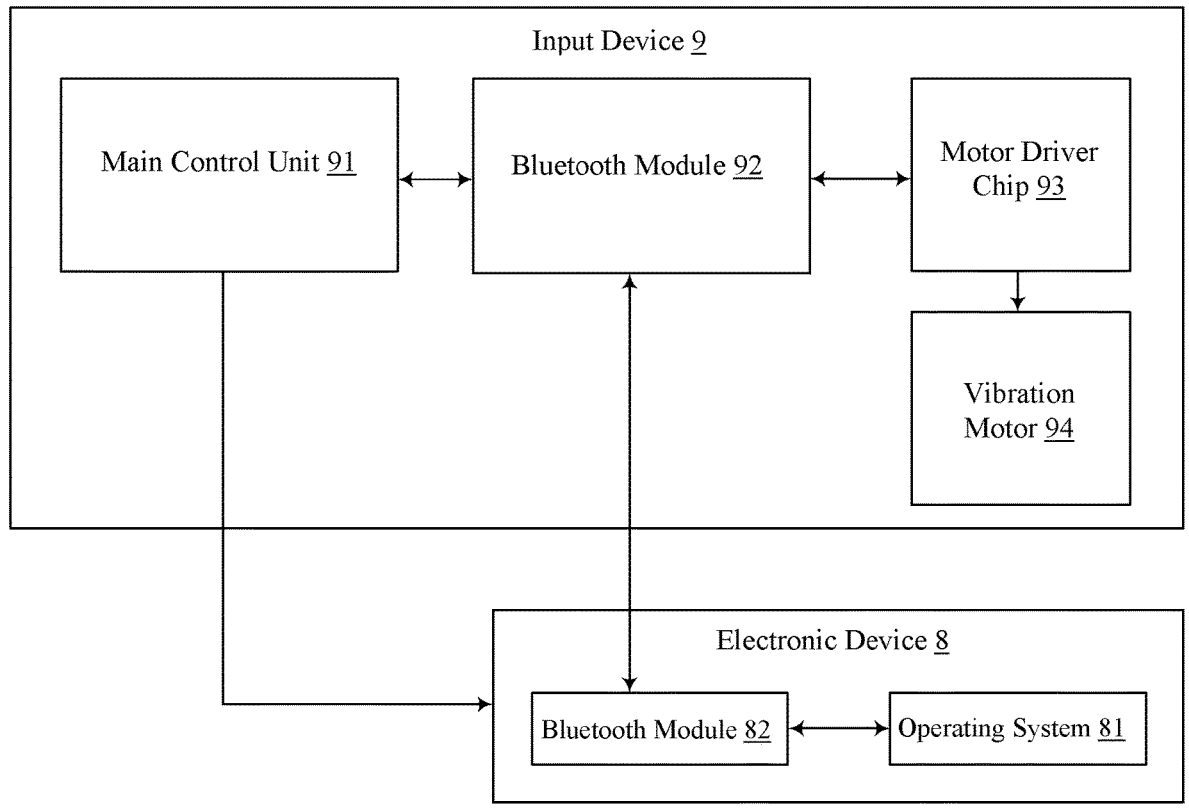
FIG. 1 is a structure diagram of a conventional haptic feedback electronic system.
Figure 2:
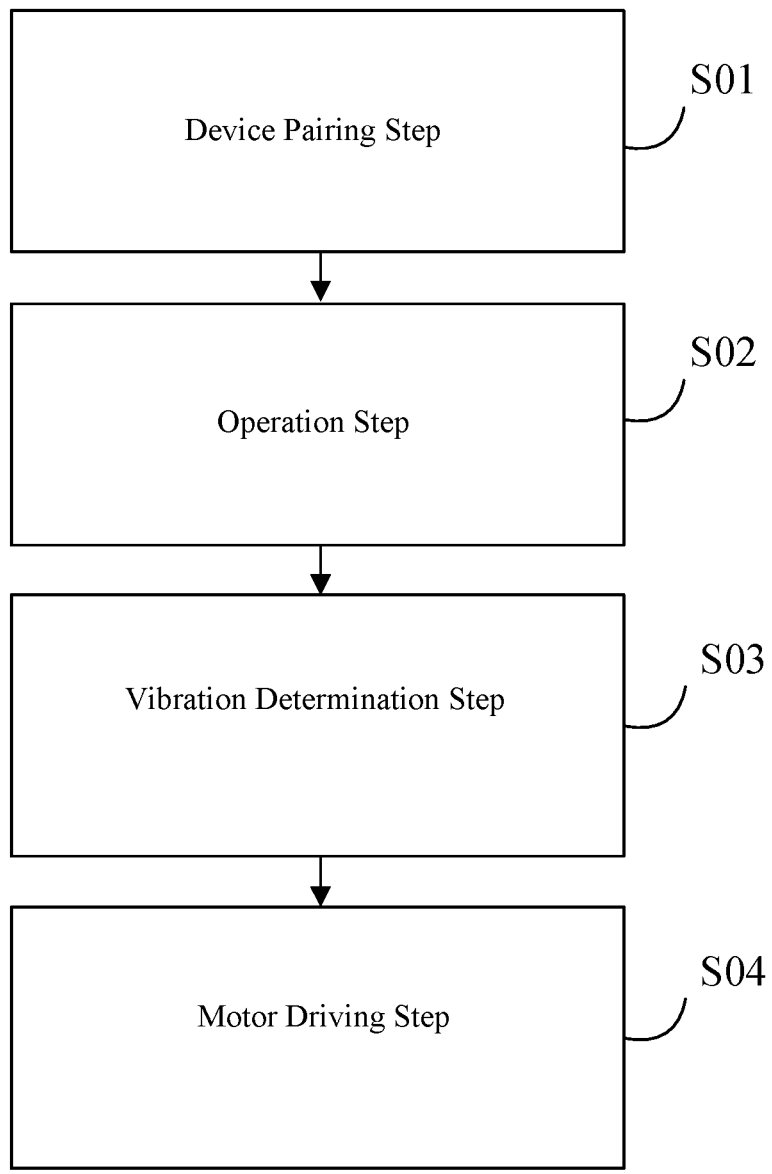
FIG. 2 is a flowchart of a haptic feedback method for an electronic system of the present invention.
Figure 3:
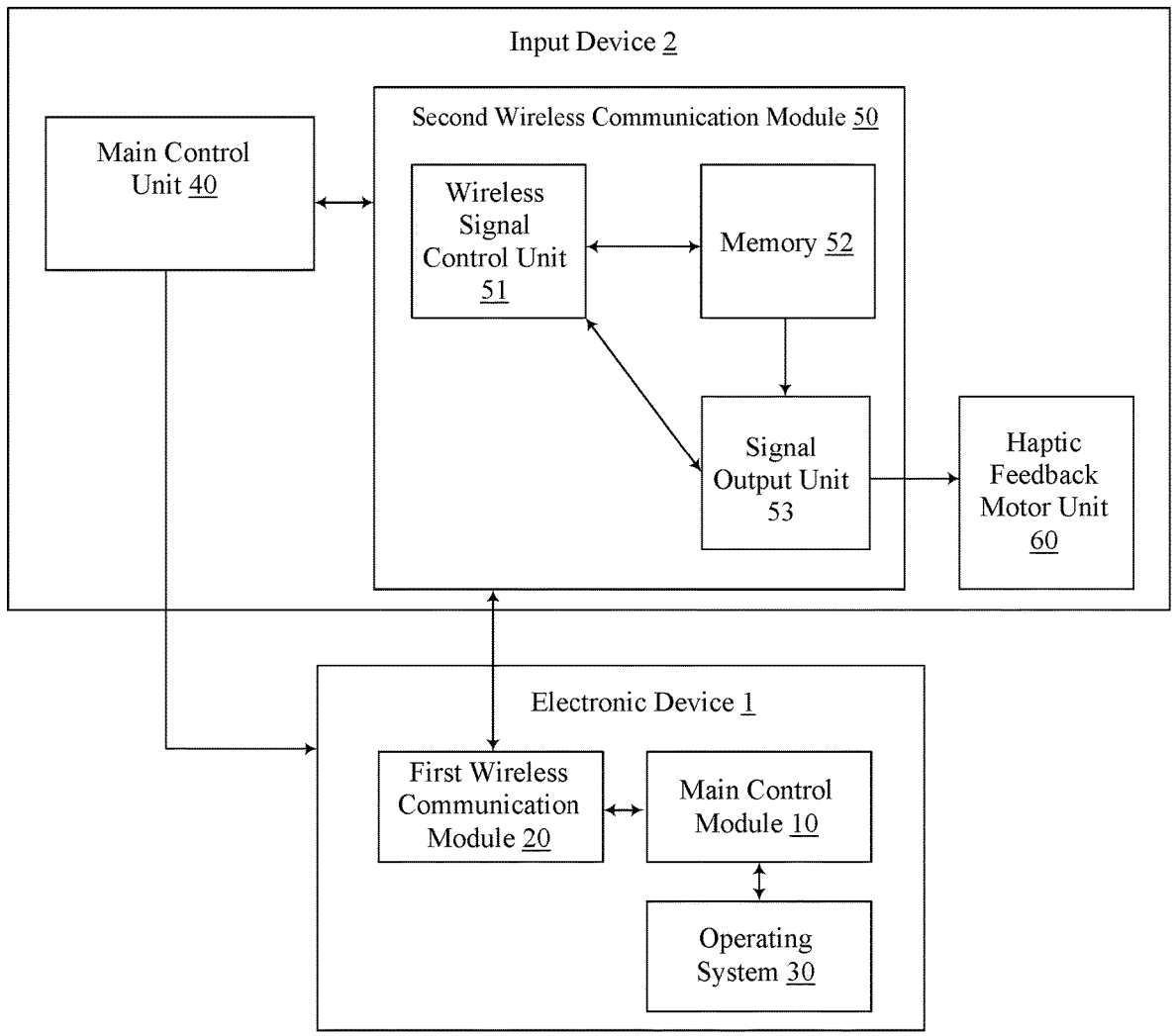
FIG. 3 is a structural block diagram of a haptic feedback electronic system of the present invention.

Please refer to FIGS. 2 and 3. The present invention provides a haptic feedback method for an electronic system and a haptic feedback electronic system, which will be described in detail below.

Referring to FIG. 3, the haptic feedback method for the electronic system of the present invention includes a device pairing step S01, an operation step S02, and a motor driving step S04.

The device pairing step S01 includes pairing an electronic device 1 and an input device 2. The electronic device 1 is provided with a first wireless communication module 20, and the input device 2 is provided with a second wireless communication module 50 and a haptic feedback motor unit 60 electrically connected to the second wireless communication module 50. The electronic device 1 and the input device 2 are wirelessly connected and pair with each other through the first wireless communication module 20 and the second wireless communication module 50.

In addition, the electronic device 1 can be a smart phone, a tablet, a desktop computer, a notebook computer, etc. The input device 2 can be one of a stylus, a mouse, a rocker, a game controller, a watch, a bracelet, a glove, and a ring.

The operation step S02 includes inputting a control signal to the electronic device 1 through the input device 2. In a preferred embodiment, the control signal includes at least a control command for controlling the electronic device. For example, when the electronic device 1 is a tablet and the input device is a stylus, the control command of the control signal may include allowing a tablet screen to sense a cursor movement caused by the stylus or movement speed of the stylus, or stylus pen pressure information, or allowing the tablet to set the stylus to have various writing modes and haptic feedback modes, such as pencil, marker, pen, etc.

The motor driving step S04 includes sending a wireless motor driving signal to the second wireless communication module 50 of the input device 2 by the first wireless communication module 20 of the electronic device 1 according to the control signal, so that the second wireless communication module 50 generates a wired motor driving signal according to the wireless motor driving signal and directly transmits the wired motor driving signal to the haptic feedback motor unit 60 to directly enable vibration of the haptic feedback motor unit 60.

In a preferred embodiment of the present invention, the first wireless communication module 20 is a first Bluetooth module, and the second wireless communication module 50 is a second Bluetooth module.

In a preferred embodiment of the present invention, the first wireless communication module 20 is a first Wi-Fi module, and the second wireless communication module 50 is a second Wi-Fi module. The aforementioned Wi-Fi module refers to a wireless communication module conforming to the Institute of Electronic and Electronics Engineers (IEEE) 802.11 protocol standard. The IEEE 802.11 protocol standard may include IEEE 802.11a, IEEE 802.11b, IEEE 802.11n, IEEE 802.11ac, IEEE 802.11ax and other protocols.

In a preferred embodiment of the present invention, the second wireless communication module 50 includes a wireless signal control unit 51, a memory 52, and a signal output unit 53. The wireless signal control unit 51 is electrically connected to the memory 52 and the signal output unit 53, and the signal output unit 53 is connected to the haptic feedback motor unit 60. It should be noted that the first wireless communication module 20 and the second wireless communication module 50 may operate in accordance with various communication standards, protocols and technologies, which are not limited to Wi-Fi.

Figure 4:
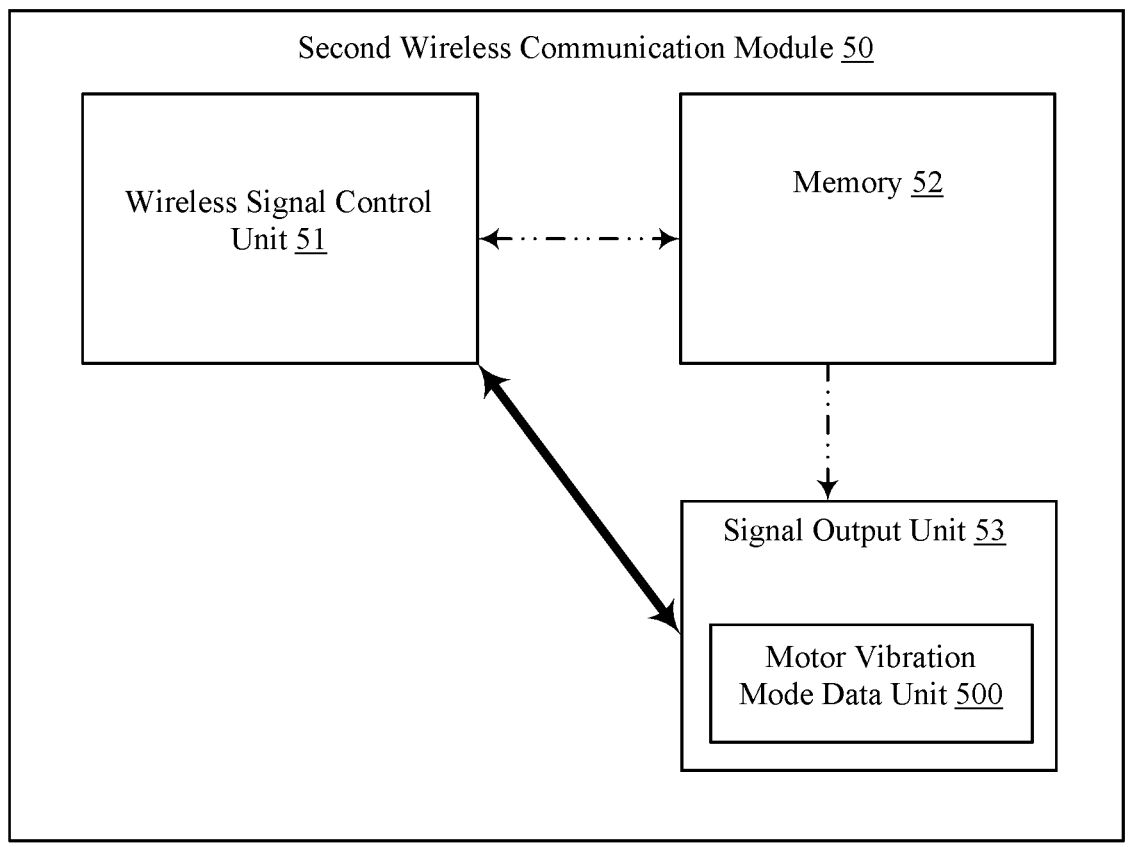
FIG. 4 is a structural block diagram of a second wireless communication module in an embodiment of the present invention.

Referring to FIG. 4, in a preferred embodiment of the present invention, a motor vibration mode data unit 500 is configured in the signal output unit 53, and the motor driving step S04 further includes: sending the wireless motor driving signal to the second wireless communication module 50 of the input device 2 through the first wireless communication module 20 of the electronic device 1 according to the control signal, so that the second wireless communication module 50, according to the wireless motor driving signal and the motor vibration mode data unit 500 in the signal output unit 53, generates the wired motor driving signal and directly transmits the wired motor driving signal to the haptic feedback motor unit 60 to directly enable vibration of the haptic feedback motor unit 60 according to a vibration mode in the motor vibration mode data unit 500. In this embodiment, the motor vibration mode data unit 500 can be a data table, or a hardware circuit built in the signal output unit 53.

Figure 5:
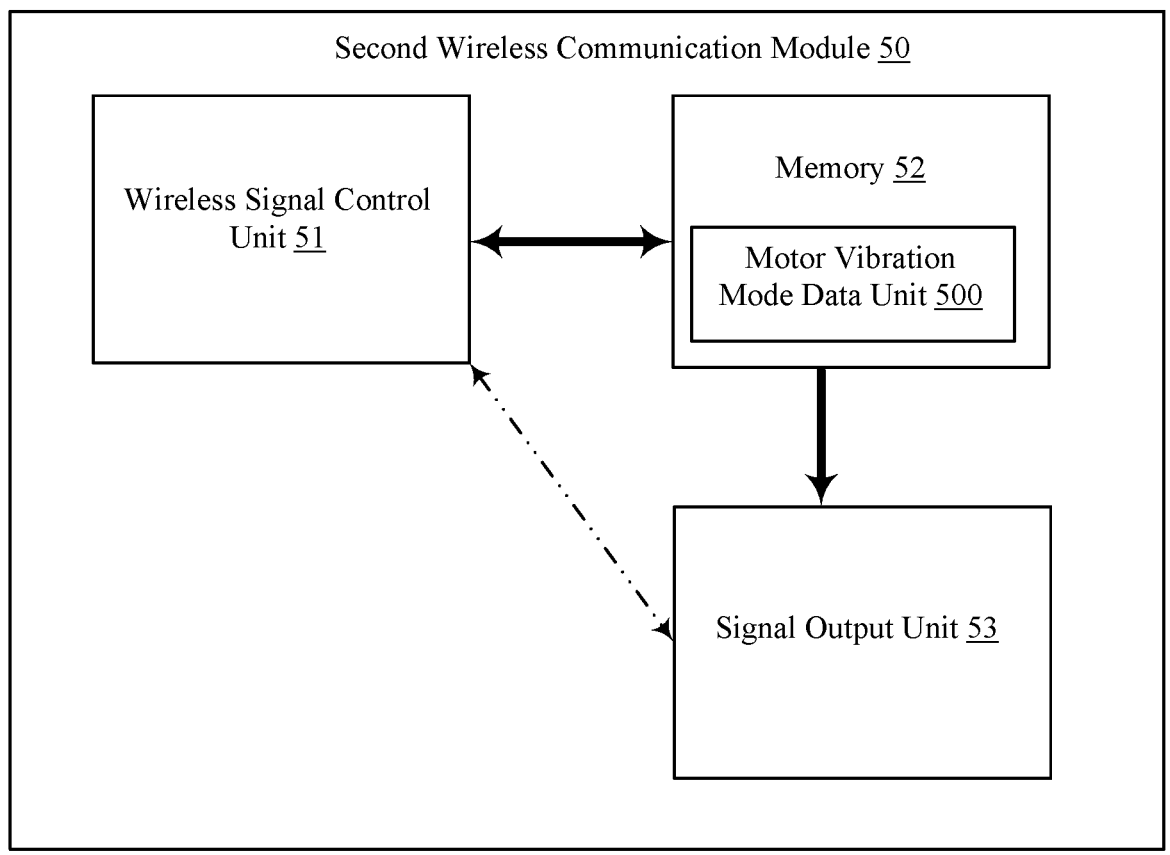
FIG. 5 is a structural block diagram of a second wireless communication module in another embodiment of the present invention in which a direct memory accessing (DMA) technology is used.

Referring to FIG. 5, in a preferred embodiment of the present invention, a motor vibration mode data unit 500 is stored in the memory 52, and the motor driving step S04 further includes: sending the wireless motor driving signal to the second wireless communication module 50 of the input device 2 through the first wireless communication module 20 of the electronic device 1 according to the control signal, so that the second wireless communication module 50, according to the wireless motor driving signal and the motor vibration mode data unit 500 in the memory 52 called by the signal output unit 53, generates the wired motor driving signal and directly transmits the wired motor driving signal to the haptic feedback motor unit 60 to directly enable vibration of the haptic feedback motor unit 60 according to a vibration mode in the motor vibration mode data unit 500. The motor vibration mode data unit 500 shown in FIG. 5 is called by using direct memory accessing (Direct Memory Access, DMA) technology. In other words, the signal output unit 53 accesses the motor vibration mode data unit 500 from the memory 52.

In a preferred embodiment of the present invention, an operating system 30 is installed in the electronic device 1. Prior to the motor driving step S04, the haptic feedback method for the electronic system further includes a vibration determination step S03. The vibration determination step S03 includes using the operating system 30 to determine whether there is a triggering vibration signal contained in the control signal and relevant control commands of the control signa, such as the cursor movement caused by the stylus or the movement speed of the stylus, or the stylus pen pressure information, or allowing the tablet to set the stylus to have various writing modes and haptic feedback modes, such as pencil, marker, pen, etc. The operating system 30 is configured to drive, only in response to determining the triggering vibration signal is contained in the control signal, the first wireless communication module to send the wireless motor driving signal. In addition, the operating system 30 can be software.

Please refer to FIG. 3. The haptic feedback electronic system of the present invention includes an electronic device 1 and an input device 2.

The electronic device 1 includes a main control module 10, a first wireless communication module 20, and an operating system 30.

The main control module 10 may include a processor, a memory, and an input device sensing unit. The input device sensing unit may be configured to receive, analyze, and convert signals of the input device 2.

The first wireless communication module 20 is electrically connected to the main control module 10.

The operating system 30 is connected to the main control module 10. In addition, the operating system 30 may be software.

The input device 2 is configured to wirelessly connect the electronic device 1 and input a control signal to the electronic device 1, and includes a main control unit 40, a second wireless communication module 50, and a haptic feedback motor unit 60. The main control unit 40 is configured to control the operation of the input device 2 and may include a processor, a memory, and a sensing signal output unit. The sensing signal output unit is configured for outputting sensing signals to the electronic device 1. The second wireless communication module 50 is electrically connected to the main control unit 40 and is configured to wirelessly connect to the first wireless communication module 20, so that the electronic device 1 is wirelessly connected to the input device 2. In addition, the haptic feedback motor unit 60 is electrically connected to the second wireless communication module 50 and is configured to vibrate according to the wired motor driving signal directly transmitted to the haptic feedback motor unit 60 through the second wireless communication module 50.

In a preferred embodiment of the present invention, the input device 2 inputs a control signal to the electronic device 1. According to the control signal, the first wireless communication module 20 of the electronic device 1 sends a wireless motor driving signal to the second wireless communication module 50 of the input device 2, so that the second wireless communication module 50, according to the wireless motor driving signal, generates a wired motor driving signal and directly transmits the wired motor driving signal to the haptic feedback motor unit 60 to directly enable vibration of the haptic feedback motor unit 60.

In a preferred embodiment of the present invention, the first wireless communication module 20 is a first Bluetooth module, and the second wireless communication module 50 is a second Bluetooth module.

In a preferred embodiment of the present invention, the first wireless communication module 20 is a first Wi-Fi module, and the second wireless communication module 50 is a second Wi-Fi module.

In a preferred embodiment of the present invention, the second wireless communication module 50 includes a wireless signal control unit 51, a memory 52, and a signal output unit 53. The wireless signal control unit 51 is electrically connected to the memory 52 and the signal output unit 53, and the signal output unit 53 is connected to the haptic feedback motor unit 60.

Referring to FIG. 4, in a preferred embodiment of the present invention, a motor vibration mode data unit 500 is configured in the signal output unit 53. Specifically, when the haptic feedback electronic system operates, the first wireless communication module 20 of the electronic device 1 sends a wireless motor driving signal to the second wireless communication module 50 of the input device 2 according to the control signal, so that the second wireless communication module 50, according to the wireless motor driving signal and the motor vibration mode data unit 500 in the signal output unit 53, generates a wired motor driving signal and directly transmits the wired motor driving signal to the haptic feedback motor unit 60 to directly enable vibration of the haptic feedback motor unit 60 according to a vibration mode in the motor vibration mode data unit 500. In this embodiment, the motor vibration mode data unit 500 can be a data table, or a hardware circuit built in the signal output unit 53.

Please refer to FIG. 5, in a preferred embodiment of the present invention, a motor vibration mode data unit 500 is configured in the memory 52. Specifically, when the haptic feedback electronic system operates, the first wireless communication module 20 of the electronic device 1 sends a wireless motor driving signal to the second wireless communication module 50 of the input device 2 according to the control signal, so that the second wireless communication module 50, according to the wireless motor driving signal and the motor vibration mode data unit 500 in the memory 52 called by the signal output unit 53, generates a wired motor driving signal and directly transmits the wired motor driving signal to the haptic feedback motor unit 60 to directly enable vibration of the haptic feedback motor unit 60 according to a vibration mode in the motor vibration mode data unit 500. A method for calling the motor vibration mode data unit 500 shown in FIG. 5 is to use the Direct Memory Access (DMA) technology. In other words, the signal output unit 53 accesses the motor vibration pattern data unit 500 from the memory 52.

In a preferred embodiment of the present invention, the operating system 30 is configured to determine whether a triggering vibration signal is contained in the control signal. Specification, the operating system 30 drives, in response to determining the triggering vibration signal is contained in the control signal through the operating system, the first wireless communication module to send a wireless motor driving signal.

1. In the haptic feedback method for the electronic system and the haptic feedback electronic system of the present invention, the input device 2 uses the second wireless communication module 50 to directly serve as a driver of the haptic feedback motor unit 60, thus omitting the additional use of a motor driver chip, which in turn simplifies the hardware circuit layout in the input device 2, enabling the input device 2 to be further miniaturized to achieve the compact design, and reducing manufacturing costs of the input device 2.

2. The signal output unit 53 or the memory 52 in the second wireless communication module 50 of the input device 2 of the present invention may pre-store or build the motor vibration model data unit 500, that is, a motor vibration mode data table or a hardware circuit. The motor vibration mode data table or the hardware circuit provides various vibration modes of a motor, such as high-frequency vibration, low-frequency vibration, continuous vibration, intermittent vibration, or compound vibration combining the above-mentioned multiple vibrations. Alternatively, the motor vibration mode data table or the hardware circuit contains a vibration algorithm defining at least one relational equation covering a moving speed of the input device 2 and the vibration frequency of the haptic feedback motor unit 60, or stylus pen pressure information and the vibration frequency of the haptic feedback motor unit 60. By means of the above-mentioned technical solutions, the second wireless communication module 50 can provide a variety of fine motor effects, and before the input device 2 leaves factories, one or more motor effects in the signal output unit 53 or the memory 52 can be enabled through manufacturer's setting software.

It should be noted that in the aforementioned embodiments of the present invention, the term "module" or "unit" as used herein is intended to include any hardware, such as specialized or dedicated circuitry, software, logic, or combination of the foregoing for implementing the functionality attributed to the module or element.

Accordingly, although the present invention has been disclosed as a preferred embodiment, it is not intended to limit the present invention. Those skilled in the art without departing from the scope of the present invention may make various changes or modifications, and thus the scope of the present invention should be after the appended claims and their equivalents.

What is claimed is:

1. A haptic feedback method for an electronic system, comprising:
   a device pairing step comprising pairing an electronic device and an input device, wherein a first wireless communication module is arranged in the electronic device, a second wireless communication module and a haptic feedback motor unit electrically connected to the second wireless communication module are arranged in the input device, and the electronic device and the input device are wirelessly connected to each other through the first wireless communication module and the second wireless communication module, wherein the second wireless communication module comprises a wireless signal control unit, a memory, and a signal output unit, the wireless signal control unit is electrically connected to the memory and the signal output unit, the signal output unit is coupled to the haptic feedback motor unit, and a motor vibration mode data unit is configured in the signal output unit;
   an operation step comprising inputting a control signal to the electronic device through the input device; and
   a motor driving step comprising sending a wireless motor driving signal to the second wireless communication module of the input device by the first wireless communication module of the electronic device according to the control signal, wherein the second wireless communication module, according to the wireless motor driving signal and the motor vibration mode data unit in the signal output unit, generates a wired motor driving signal and directly transmits the wired motor driving signal to the haptic feedback motor unit to directly enable vibration of the haptic feedback motor unit according to a vibration mode in the motor vibration mode data unit.

2. The haptic feedback method for the electronic system of claim 1, wherein the first wireless communication module is a first Bluetooth module, and the second wireless communication module is a second Bluetooth module.

3. The haptic feedback method for the electronic system of claim 1, wherein the first wireless communication module is a first Wi-Fi module, and the second wireless communication module is a second Wi-Fi module.

4. The haptic feedback method for the electronic system of claim 1, wherein an operating system is installed in the electronic device, and prior to the motor driving step, the haptic feedback method for the electronic system further comprises a vibration determination step, wherein the vibration determination step comprises:
   driving, only in response to determining a triggering vibration signal is contained in the control signal through the operating system, the first wireless communication module to send the wireless motor driving signal.

5. A haptic feedback electronic system, comprising:
   an electronic device comprising a main control module, a first wireless communication module, and an operating system, the first wireless communication module electrically connected to the main control module, and the operating system coupled to the main control module; and
   an input device configured to wirelessly connect to the electronic device and input a control signal to the electronic device and comprising a main control unit, a second wireless communication module, and a haptic feedback motor unit, wherein the first wireless communication module is configured to send a wireless motor driving signal to the second wireless communication module according to the control signal;
   wherein the second wireless communication module comprises a wireless signal control unit, a memory, and a signal output unit, the wireless signal control unit is electrically connected to the memory and the signal output unit, and the signal output unit is coupled to the haptic feedback motor unit;
   wherein a motor vibration mode data unit is configured in the signal output unit or is stored in the memory, and the second wireless communication module is electrically connected to the main control unit and is configured to wirelessly connect to the first wireless communication module, so that the electronic device is wirelessly connected to the input device, and the haptic feedback motor unit is electrically connected to the second wireless communication module and is configured to vibrate according to a wired motor driving signal directly transmitted to the haptic feedback motor unit through the second wireless communication module.

6. The haptic feedback electronic system of claim 5, wherein the second wireless communication module generates the wired motor driving signal according to the wireless motor driving signal and directly transmits the wired motor driving signal to the haptic feedback motor unit to directly enable vibration of the haptic feedback motor unit.

7. The haptic feedback electronic system of claim 5, wherein the first wireless communication module is a first Bluetooth module, and the second wireless communication module is a second Bluetooth module.

8. The haptic feedback electronic system of claim 5, wherein the first wireless communication module is a first Wi-Fi module, and the second wireless communication module is a second Wi-Fi module.

9. The haptic feedback electronic system of claim 5, when the haptic feedback electronic system operates, the first wireless communication module of the electronic device sends the wireless motor driving signal to the second wireless communication module of the input device according to the control signal, so that the second wireless communication module, according to the wireless motor driving signal and the motor vibration mode data unit in the signal output unit, generates the wired motor driving signal and directly transmits the wired motor driving signal to the haptic feedback motor unit to directly enable vibration of the haptic feedback motor unit according to a vibration mode in the motor vibration mode data unit.

10. The haptic feedback electronic system of claim 5, wherein when the haptic feedback electronic system operates, the first wireless communication module of the electronic device sends the wireless motor driving signal to the second wireless communication module of the input device according to the control signal, so that the second wireless communication module, according to the wireless motor driving signal and the motor vibration mode data unit in the memory called by the signal output unit, generates the wired motor driving signal and directly transmits the wired motor driving signal to the haptic feedback motor unit to directly enable vibration of the haptic feedback motor unit according to a vibration mode in the motor vibration mode data unit.

11. The haptic feedback electronic system of claim 5, wherein the operating system is configured to drive, in response to determining a triggering vibration signal is contained in the control signal through the operating system, the first wireless communication module to send the wireless motor driving signal.

12. A haptic feedback method for an electronic system, comprising:
   a device pairing step comprising pairing an electronic device and an input device, wherein a first wireless communication module is arranged in the electronic device, a second wireless communication module and a haptic feedback motor unit electrically connected to the second wireless communication module are arranged in the input device, and the electronic device and the input device are wirelessly connected to each other through the first wireless communication module and the second wireless communication module, wherein the second wireless communication module comprises a wireless signal control unit, a memory, and a signal output unit, the wireless signal control unit is electrically connected to the memory and the signal output unit, the signal output unit is coupled to the haptic feedback motor unit, and a motor vibration mode data unit is stored in the memory;
   an operation step comprising inputting a control signal to the electronic device through the input device; and
   a motor driving step comprising sending a wireless motor driving signal to the second wireless communication module of the input device by the first wireless communication module of the electronic device according to the control signal, wherein the second wireless communication module, according to the wireless motor driving signal and the motor vibration mode data unit in the memory called by the signal output unit, generates a wired motor driving signal and directly transmits the wired motor driving signal to the haptic feedback motor unit to directly enable vibration of the haptic feedback motor unit according to a vibration mode in the motor vibration mode data unit.

13. The haptic feedback method for the electronic system of claim 1, wherein an operating system is installed in the electronic device, and prior to the motor driving step, the haptic feedback method for the electronic system further comprises a vibration determination step, wherein the vibration determination step comprises:
   driving, only in response to determining a triggering vibration signal is contained in the control signal through the operating system, the first wireless communication module to send the wireless motor driving signal.

\* \* \* \* \*